United States Patent Office 3,069,384
Patented Dec. 18, 1962

3,069,384
SULFUR-CONTAINING PHENOLIC COMPOUNDS
Thomas H. Coffield, Farmington, Mich., assignor to Ethyl Corporation, New York, N.Y., a corporation of Delaware
No Drawing. Filed Dec. 9, 1958, Ser. No. 779,068
2 Claims. (Cl. 260—45.95)

This invention relates to novel chemical compounds and to compositions of matter containing these compounds as antioxidants.

It has been discovered that a heretofore unknown class of phenolic compounds possesses outstanding antioxidant properties in a wide variety of organic materials which are subject to oxidative decomposition in the presence of air, oxygen or ozone.

It is an object of this invention to provide a novel class of phenolic compounds possessing outstanding antioxidant characteristics. Anther object is to provide novel compositions of matter containing a specific type of phenolic compounds as an oxidation inhibitor. A further object is to provide a novel class of phenolic sulfur compounds which have outstanding antioxidant properties when used in small amounts in hydrocarbon fuel and lubricant compositions, rubber and certain synthetic hydrocarbon polymers. A still further object is to provide as new compositions of matter, synthetic hydrocarbon polymers which are stabilized by the phenolic sulfur compounds herein disclosed. A specific object of this invention is to provide polyethylene which possesses outstanding oxidative stability.

The objects of this invention are accomplished by a compound having the formula:

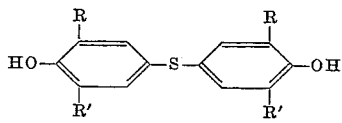

wherein R is an alkyl group branched on the alpha carbon atom and having from 3 to 4 carbon atoms inclusive and R' is an alkyl group having from 1 to 4 carbon atoms.

Examples of the compounds of this invention include: 4,4' - thiobis(2,6 - di - tert - butylphenol), 4,4' - thiobis(2-methyl - 6 - isopropylphenol), 4,4' - thiobis(2 - ethyl - 6-sec - butylphenol), 4,4' - thiobis(2,6 - diisoproylphenol), 4,4' - thiobis(2 - methyl - 6 - tert - butylphenol) and the like.

The alkyl radical represented by R in the above formula includes the isopropyl group, the tert-butyl group and the secondary butyl group. It has been discovered that the novel compounds containing these groups are readily prepared and are extremely effective antioxidants in synthetic hydrocarbon polymers as will be described in more detail below. Those compounds in which R is a tert-butyl or isopropyl group are preferred as it has been found that they are among the more outstanding antioxidants for saturated hydrocarbon polymers discovered to date. Of these, 4,4'-thiobis(2-methyl-6-tert-butylphenol) and 4,4'-thiobis(2,6-di-tert-butylphenol) are the most particularly preferred due to their low cost and outstanding antioxidant activities.

The compounds of this invention may be prepared by several processes. One of these consists of reacting the parent phenolic compound (for example, 2-methyl-6-tert-butylphenol) with sulfur dichloride. A special method is applicable to the preparation of a particular compound of this invention, namely, 4,4'-thiobis(2,6-di-tert-butylphenol). Whereas this compound is produced by the reaction of sulfur dichloride with 2,6-di-tert-butylphenol, it has also been found to be susceptible to preparation by a process which comprises the reaction of the alkali metal salt of 2,6-di-tert-butylphenol with sulfur dichloride. This method of preparation is not applicable to other compounds of this invention as the phenol starting materials do not have alkali metal salts which are the chemical equivalent of the salt of 2,6-di-tert-butylphenol.

The following examples, in which all parts are by weight, are illustrative of the methods for preparing the compounds of this invention.

*Example I*

A solution of 32.8 parts of 2-methyl-6-tert-butylphenol in 18 parts petroleum ether (B. 36–38°) was stirred while a solution of 10.3 parts of freshly distilled $SCl_2$ in 5 parts petroleum ether was added slowly at 15–20°. The exothermic reaction was controlled with external cooling. After half the $SCl_2$ solution had been added, the reaction mixture was stirred at 20–28° C. for ½ hour. The rest of the $SCl_2$ was then added slowly at 20° and then the mixture was stirred at 24–28° for 2 hours.. The reaction mixture was filtered, and the addition of a small amount of fresh solvent caused precipitation of a crystalline product. After washing with solvent, 22.3 parts of the crude product were recovered. This represents 62.3 percent yield of 4,4'-thiobis(2-methyl-6-tert-butylphenol) having a melting point of 114–117.5°. Treatment with activated charcoal and recrystallization from cyclohexane gave white crystals having a melting point of 124–125° C. Analysis of the compound showed it to contain about 9.05 percent sulfur (calculated sulfur content for 4,4'-thiobis-(2-methyl-6-tert-butylphenol) is 8.94 percent).

*Example II*

2-methyl-6-tert-butylphenol (4920 parts) was dissolved in 2700 parts of low boiling petroleum ether. The mixture was charged to a stirred reaction vessel equipped with external cooling means. To the stirred reaction vessel was added 1545 parts of sulfur dichloride contained in 750 parts of low boiling petroleum ether in the following manner: The reaction vessel was maintained at between 15–17° C. while the sulfur dichloride solution was slowly added. After about 45 percent of the sulfur dichloride had been added, a white solid precipitated making the reaction mass extremely viscous and raising the temperature of the reactor to about 18° C. At this point, 1200 additional parts of petroleum ether were added so that the reaction mixture could be easily agitated. As the additional sulfur dichloride was added, more solvent was periodically added to maintain the reaction mass in a sufficiently fluid condition to permit agitation. A total of 2400 additional parts of low boiling petroleum ether was added during the course of the addition of the sulfur dichloride. After the sulfur dichloride addition was completed, the reaction mass was warmed with stirring to 28° C. and maintained at between 28–30° C. for an additional hour. The reaction mass was then cooled to 10° C. and maintained at this temperature for ½ hour after which it was filtered and the solids pressed dry. The solids were then slurried with petroleum ether and the mixture was again filtered and pressed dry. Thirty-eight hundred parts of 4,4'-thiobis(2-methyl-6-tert-butylphenol) (a 71 percent yield) where recovered in this manner.

*Example III*

A solution of 227 parts of distilled $SCl_2$ and about 240 parts of petroleum ether (boiling point 36.5–38° C.) was added slowly with stirring to a solution of 712 parts of 2,6-diisopropylphenol in 400 parts of the petroleum ether. External cooling was applied to maintain the reaction mixture at about 17° C. About ½ the sulfur dichloride solution was added over a 30 minute period during which time the evolution of HCl gas indicated that the reaction was proceeding. After ½ the sulfur dichloride had been added, the solution was refluxed at 38° C. for ½ hour. The remaining sulfur dichloride was then slowly added over a half hour period while the temperature was maintained between 18 and 24° C. The mixture was again refluxed for 30 minutes and then treated with activated charcoal, filtered and additional petroleum ether added. This reaction produced 4,4'-thiobis(2,6-diisopropylphenol), a valuable antioxidant of this invention.

*Example IV*

To a reaction vessel was charged 4,000 parts of carbon tetrachloride, 444 parts of carbon disulfide and 515 parts of 2,6-di-tert-butylphenol. The mixture was cooled to −15° C. and 129 parts of sulfur dichloride was slowly added thereto over a 1½ hour period. The mixture was then stirred at room temperature for 1½ hour and then heated to 50° C. for 15 minutes. The volatiles were then removed under reduced pressure producing a mixture of solid and oil which was dissolved in ether and washed with aqueous sodium carbonate, water and then dried over magnesium sulfate. 4,4'-thiobis(2,6-di-tert-butylphenol) is recovered from this reaction mixture.

*Example V*

A solution of 34 parts of freshly distilled sulfur dichloride in about 25 parts of petroleum ether was slowly added with stirring to a solution of 123.6 parts of 2,6-di-tert-butylphenol in 60 parts of petroleum ether. One-half of the sulfur dichloride was added slowly at 20 to 25° C. and the mixture was heated to reflux, then cooled to 25° C. and the remaining sulfur dichloride was slowly added. Thereafter the mixture was kept at reflux for 99 hours. The solvent and volatiles were stripped under vacuum. Thereafter the resulting brownish-black oil was subjected to distillation and the residue was fractionally crystallized from methanol. The third fraction of crystals yielded 5 parts of 4,4'-thiobis(2,6-di-tert-butylphenol) having a melting point of 138–140° C. The compound was submitted for sulfur analysis and found to contain 7.5 percent sulfur. The calculated composition of 4,4'-thiobis(2,6-di-tert-butylphenol) is 7.24 percent.

*Example VI*

A solution of 656 parts of 2-methyl-6-tert-butylphenol in 360 parts of petroleum ether was charged to a glass reaction vessel. A solution of 204 parts of sulfur dichloride in about 60 parts of petroleum ether was added slowly while the reaction mass was maintained at 10–20° C. with the aid of external cooling. After a considerable portion of the sulfur dichloride solution had been added, the reaction mixture became turbid and there was evidence of HCl evolution. The addition of the sulfur dichloride solution was halted and the mixture was stirred for about 15 minutes after which time the remaining sulfur dichloride was slowly added. After the sulfur dichloride addition, the temperature was allowed to raise and was maintained at below 30° C. for ½ hour. After remaining over-night in the stirred reaction vessel, the mixture was filtered and the reaction mass then worked up as described in Example II. A 49.4 percent yield of 4,4'-thiobis(2-methyl-6-tert-butylphenol) having a melting point of 119–120° C. was recovered.

*Example VII*

A solution of 600 parts of 2-isopropyl-6-tert-butylphenol in 360 parts of petroleum ether is agitated while a solution of 260 parts of sulfur dichloride in 10 parts of the petroleum ether is added slowly at about 15° C. Additional petroleum ether is added during the course of the reaction to dilute the mixture and lessen the heat evolution. This procedure enables the sulfur dichloride to be added at a more rapid rate. During the addition of the sulfur dichloride, the temperature is lowered by external cooling and maintained at 10 to 15° C. The addition of sulfur dichloride is completed in 8 hours after which the mixture is heated to reflux for one hour and then cooled and filtered. The solid precipitate is collected and washed with petroleum ether and dried. A high yield of 4,4'-thiobis(2-isopropyl-6-tert-butylphenol) is realized. It may be purified by recrystallization from n-hexane.

The reaction between the phenolic compound and sulfur dichloride is exothermic and is preferably conducted at from about 5° to about 20° C. This is easily accomplished by external cooling of the reaction mixture while the reactants are under agitation. Higher temperatures lead to undesirable side reactions and consequently greatly reduce the yield of the desired product.

A stoichiometric amount of phenol is employed in preparing the compounds of this invention. Thus, for each mole of sulfur dichloride employed, two moles of phenol are present in the reaction mixture.

As is illustrated by the above example, it is convenient to conduct the preparation of the compounds of this invention in a suitable solvent. In general, the solvents applicable include low boiling hydrocarbons, halogenated hydrocarbons, and inert aromatic compounds such as nitrobenzene. Examples of suitable solvents include carbon tetrachloride, chloroform, n-hexane, 2,4-di-bromo pentane, low boiling petroleum ether and the like.

A preferred procedure consists of slowly adding ½ the sulfur dichloride to the phenol and then allowing the reaction to proceed under agitation and proper conditions to maintain the desired temperature; and subsequently slowly adding the balance of the sulfur dichloride which is also contained in a suitable solvent. After the entire amount of sulfur dichloride has been added to the reaction vessel, agitation is allowed to continue at the selected temperature. Slow addition of the sulfur dichloride prevents undesirable side reactions.

After initial filtration to remove solids, the compounds of this invention may then be separated from the reaction mixture by precipitation. In some cases the addition of excess fresh solvent causes precipitation of the product. The crude product may then be recrystallized from a suitable solvent such as cyclohexane. Best results are obtained when extremely pure starting materials are employed in conducting the reaction to prepare a compound of this invention. It has been found that whereas the pure products of the reaction are insoluble in the reaction solvent, they become soluble when impurities are present. Thus, when pure starting materials are used, the possibility of the product being soluble in the reaction system is decreased. Often this solubility problem can be overcome by the addition of excess fresh solvent at the end of the reaction period to reduce the impurities to such a low concentration that the product is no longer soluble in the reaction medium.

*Example VIII*

A glass reaction vessel was charged with 2061 parts of 2,6-di-tert-butylphenol in about 1800 parts of methanol. To this was added a stoichiometric quantity of sodium methylate in about 2700 parts of methanol. This mixture was allowed to stand for several days at room temperature after which the methanol was removed under reduced pressure and about 4500 parts of tetrahydrofuran were added. The resulting tetrahydrofuran solution of sodium 2,6-di-tert-butylphenolate was treated with 721 parts of sulfur dichloride. The addition of the sulfur dichloride was made at 45–50 C°. The reaction mixture was then stirred for 1½ hours and heated at reflux for 15 minutes. After cooling, the mixture was poured into water and extracted with ether. The ether extracts were dried over magnesium sulfate. The resulting ether extract yields 4,4'-thiobis-(2,6-di-tert-butylphenol), an antioxidant of this invention.

The compounds of this invention have been found to be outstanding antioxidants. Thus, an embodiment of this invention is a new composition of matter which comprises organic material normally tending to undergo oxidative deterioration in the presence of air, oxygen or ozone, containing a small antioxidant quantity, up to 5 percent, of a compound having the formula:

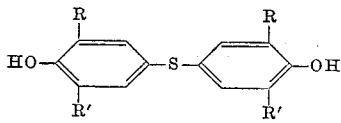

wherein R is an alkyl group branched on the alpha carbon atom having from 3 to 4 carbon atoms inclusive and R' is an alkyl group having from 1 to 4 carbon atoms.

The compounds of this invention find important utility as antioxidants in a wide variety of oxygen sensitive materials. Thus, liquid hydrocarbon fuels such as gasoline, kerosene and fuel oil are found to possess greatly increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes; soaps and greases; plastics; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like.

The compounds of this invention are also useful in protecting petroleum wax—paraffin wax and micro-crystalline wax—against oxidative deterioration. The compounds of this invention also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter, fat, lard, beef tallow, and the like.

The novel compounds of this invention have been found to be outstandingly effective antioxidant additives for saturated hydrocarbon synthetic polymers. Thus, an embodiment of this invention is a novel composition of matter comprising a saturated hydrocarbon synthetic polymer derived from polymerization of an aliphatic monoolefin hydrocarbon compound having up to 4 carbon atoms and a small antioxidant quantity, up to 5 percent, of a compound having the formula:

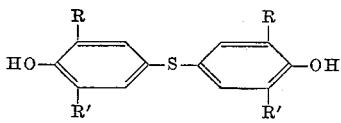

wherein R is an alkyl group branched on the alpha carbon and having from 3 to 4 carbon atoms inclusive and R' is an alkyl group having from 1 to 4 carbon atoms.

The saturated hydrocarbon synthetic polymer which has greatly enhanced oxidative stability by the practice of this invention, includes polymers obtained from the polymerization of a hydrocarbon monoolefin having up to 4 carbon atoms. Examples of such monomers include ethylene, propylene, butylene and isobutylene. Thus, the polymers are homopolymers and copolymers of ethylene, propylene, butylene and isobutylene.

A preferred embodiment of this invention is polyethylene containing a small antioxidant quantity, up to about 5 percent, of a 4,4'-thiobis(substituted phenol) as defined above. A particularly preferred embodiment of this invention comprises polyethylene containing from about 0.01 to about 2 percent of such a 4,4'-thiobis(substituted phenol). In particular it has been found that when from 0.01 to about 2 percent of 4,4'-thiobis(2-methyl-6-tert-butylphenol) is incorporated with polyethylene, compositions of outstanding oxidative stability result. Another particularly effective compound within the scope of this invention is 4,4'-thiobis(2,6-di-tert-butylphenol).

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 to 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of groups IVB, VB and VIB metals of the periodic system; chromium oxide on silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° C. The oxygen pressure is maintained at 1 atmosphere by means of the leveling bulb. The oxygen uptake at the elevated temperature is recorded for the duration of the test. This procedure has been adopted since it has been found that many compounds may inhibit the oxidation for a certain induction period after which time a very sharp increase in the rate of oxygen uptake occurs indicating that the antioxidant has been exhausted. In tests of this nature, it has been found that the compositions of this invention inhibit the absorption of oxygen by the polyethylene to such an extent that they are among the most outstanding antioxidants tested to date even when compared to very closely related compounds. For example, a sample of the polyethylene with no added antioxidant was tested according to this procedure and was found to take up oxygen rapidly with no initial induction period. After 20 hours of heating, over 45 milliliters of oxygen had been absorbed.

The outstanding results obtainable with the antioxidant compounds of this invention in contrast to those obtained with the uninhibited polyethylene are demonstrated by a test which was conducted with 4,4'-thiobis(2-methyl-6-tert-butylphenol), a compound of this invention having the formula:

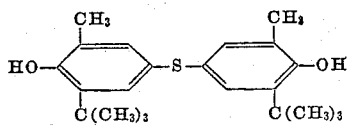

When 0.2 percent of the 4,4'-thiobis(2-methyl-6-tert-butylphenol) was compounded with the same polyethylene as used in the above test, the induction period had not expired after 160 hours of heating at 150° C. That is to say the sample of polyethylene had absorbed no oxgen after 160 hours of heating. The test was discontinued after 160 hours and the induction period is apparently even longer than this. Thus, the compounds of this invention are outstandingly superior antioxidants for saturated hydrocarbon polymers.

There are several methods available for preparing the inhibited hydrocarbon polymer compositions of this invention. Thus the blending of the 4,4'-thiobis(substituted phenol) compounds of this invention, with a polymer such as, for example, polyethylene, may be carried out on open rolls, on internal mixers or may be accomplished by mixing with extrusion. It is also possible to prepare concentrated batches of the polymer containing excessive amount of the 4,4'-thiobis(substituted phenol) compounds of this invention and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The 4,4'-thiobis(substituted phenol) compounds of this invention may be initially mixed with the polymer in the dried state or may be first dissolved in a suitable solvent, then sprayed on the polymer and milled in.

Examples of the hydrocabon polymer compositions of this invention prepared as described above, follow. All parts and percentages are by weight in these examples.

*Example IX*

To 1,000 parts of polyethylene produced by oxygen catalyzed reaction under a pressure of 20,000 atmospheres and having an average molecular weight of 40,000, is added and mixed 2 parts of 4,4'-thiobis(2-methyl-6-tert-butylphenol). The resulting composition has a greatly increased oxidative stability. Excellent results are also obtained when similar quantities of 4,4'-thiobis(2-n-propyl-6-tert-butylphenol), 4,4'-thiobis(2-6-di-tert-butyl phenol), 4,4'-thiobis(2-isopropyl-6-sec-butyl phenol), and the like are employed.

*Example X*

To 10 parts of polyisobutylene having an average molecular weight of 100,000 is added 0.5 part 4,4'-thiobis(2,6-diisopropylphenol). The oxidative stability of the polymer is greatly increased by the addition of this compound. Excellent results are also obtained with similar quantities of 4,4'-thiobis(2-isopropyl-6-tert-butylphenol).

*Example XI*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-thiobis(2-isopropyl-6-tert-butylphenol). Polyethylene of improved oxidative stability results. Similar results are obtained with 4,4'-thiobis-(2-methyl-6-tert-butylphenol).

*Example XII*

A linear polyethylene having a high degree of crystallinity (up to 93 percent) and below 1 ethyl branched chain per hundred carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent of 4,4'-thiobis(2-methyl-6-tert-butylphenol), and the resulting product has improved stability characteristics.

*Example XIII*

To a polyethylene having an average molecular weight of 1500, a melting point of 88–90° C. and a specific gravity of 0.92 is added 1 percent of 4,4'-thiobis(2-ethyl-6-tert-butylphenol). After milling in the antioxidant an extremely oxidation resistant product results. Good results are also obtained with such compounds of this invention as 4,4'-thiobis(2-ethyl-6-isopropylphenol), 4,4'-thiobis(2,6-di - sec - butylphenol), 4,4' - thiobis(2-ethyl-6-tert-butylphenol) and the like.

*Example XIV*

Two parts of 4,4'-thiobis(2,6-di-tert-butylphenol) are added with milling to 100 parts of a low density polyethylene prepared by high pressure polymerization and which has an average molecular weight of about 20,000. The resulting product is vastly improved in its oxidative stability.

*Example XV*

To 10,000 parts of a polyethylene having an average molecular weight of about 100,000 and which has a tensile strength of 5400 p.s.i., a Shore D hardness of 70 and a softening temperature of 130° C. under low load is added 10 parts 4,4'-thiobis(2-methyl-6-tert-butylphenol), to prepare a composition of outstanding oxidative stability.

*Example XVI*

To a polyisobutylene polymer having an average molecular weight of 35,00 is added sufficient 4,4'-thiobis(2-methyl-6-tert-butylphenol) to give a composition containing 0.03 percent of the antioxidant. The composition has improved antioxidant properties due to the presence of 4,4'-thiobis(2-methyl-6-tert-butylphenol).

In addition to the 4,4'-thiobis(saturated phenol), the saturated hydrocarbon polymers of this invention may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

Another embodiment of the present invention is rubber containing as an antioxidant therefor, a 4,4'-thiobis(substituted phenol) as defined above. Another part of this invention is the method of preserving rubber which comprises incorporaating therein a 4,4'-thiobis(2,6-di-substituted phenol) as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled wth the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and co-polymers exemplified by the butadiene-styrene (GR-S) and butadiene-acrylonitrile (GR-N or Paracril) rubbers and the like, although the invention is applicable to the stabilization of any rubbery, high molecular weight organic material which is normally susceptible to deterioration in the presence of oxygen, air, or ozone. The nature of these rubbers is well known to those skilled in the art.

Among the definite advantages provided by this inventon is that the present rubber compositions possess unusually great resistance against oxidative deterioration. Moreover, these compositions exhibit excellent non-staining and non-discoloration characteristics. Furthermore, the novel thiobisphenol stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The present invention will be still further apparent from the following specific examples wherein all parts and percentages are by weight.

Example XVII

To a synthetic rubber master batch comprising 100 parts of GR-S rubber having an average molecular weight of 60,000, 50 parts of mixed zinc propionate-stearate, 50 parts of carbon black, 5 parts of road tar, 2 parts of sulfur and 1.5 parts of mercapto-benzothiazole is incorporated 1.5 parts of 4,4'-thiobis(2,6-di-tert-butylphenol). This batch is then cured for 60 minutes at 45 p.s.i. of steam pressure.

Example XVIII

Two parts of 4,4'-thiobis(2-methyl-6-tert-butylphenol) is incorporated in 100 parts of raw butyl rubber prepared by the copolymerization of 90 percent of isobutylene and 10 percent of isoprene.

Example XIX

To 200 parts of raw butyl rubber prepared by copolymerization of 95 percent of isobutylene and 5 percent of butadiene is added 1.5 parts of 4,4'-thiobis(2-methyl-6-isopropylphenol).

Example XX

To a master batch of GR-N synthetic rubber comprising 100 parts of GR-N rubber, 5 percent of zinc stearate, 50 parts of carbon black, 5 parts of road tar, 2 parts of sulfur and 2 parts of mercaptobenzothiazole is added 5 percent based on the weight of the batch of 4,4'-thiobis(2-n-butyl-6-isopropylphenol).

Example XXI

To natural rubber (Hevea) is added 0.1 percent of 4,4'-thiobis(2-ethyl-6-sec-butylphenol).

Example XXII

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 4,4'-thiobis(2-methyl-6-tert-butylphenol) | 1 |
| Benzothiazyl disulfide | 0.4 |
| Amine activator | 0.5 |

This stock is then vulcanized for 60 minutes at 280° F.

Example XXIII

A butadiene-acrylonitrile co-polymer is produced from butadiene-1,3 and 32 percent of acrylonitrile. Two percent (based on the dry weight of the co-polymer) of 4,4'-thiobis(2,6-di-tert-butylphenol) is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Example XXIV

Three percent of 4,4'-thiobis(2,6-diisopropylphenol) emulsified in sodium oleate is added to a rubber-like, co-polymer of butadiene-1,3 and styrene containing 25 percent of combined styrene.

Example XXV

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts of 4,4'-thiobis(2-n-propyl-6-sec-butylphenol). The stock so compounded is cured by heating for 45 minutes at 126° C. in a press.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 4,4'-thiobis(2-methyl-6-tert-butylphenol), and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM Designation: D-572-52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D-412-51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occurs during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with 4,4'-thiobis(2-methyl-6-tert-butylphenol) gives results which show this additive to be an excellent antioxidant.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress, and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery co-polymer of conjugated diene with one or more polymerizable monoolefinic compounds which have the capability of forming rubbery co-polymers with butadiene-1,3, outstanding examples of such monoolefinic compounds being those having the group $CH_2=C<$, exemplified by styrene. Examples of such monoolefins are styrene, vinyl naphthalene, alpha methyl styrene, para-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl-substituted vinyl pyridines, etc. In fact, excellent stabilization is achieved by incorporating 4,4'-thiobis(2,6-di-tert-butylphenol) in any of the well-known elastomers which are normally susceptible to deterioration in the presence of air, such as elastoprenes, elastolenes, elastothiomers, and elastoplastics.

As indicated above, the novel thiobis phenols of this invention also find important utility as antioxidants in other organic media. The following examples illustrate typical compositions containing these compounds.

*Example XXVI*

To 1000 parts of gasoline having 44.0 percent paraffins, 17.9 percent olefins and 38.1 percent aromatics, an initial evaporation temperature of 94° F. and a final evaporation temperature of 119° F. is added 10 parts of 4,4'-thiobis(2-methyl-6-tert-butylphenol). The mixture is agitated to dissolve the mixture. The resulting fuel has an excellent stability to oxidative deterioration.

*Example XXVII*

To 1000 parts of commercially available diesel fuel having an octane number of 51.7 and a 50 percent evaporation temperature of 509° F. is added 3 parts of 4,4'-thiobis(2,6-di-tertbutylphenol). The resulting fuel is stable to oxidative deterioration.

*Example XXVIII*

To an antiknock fluid composition which is to be used as an additive to gasoline and which contains 61.5 parts of tetraethyl lead, 17.9 parts of ethylene dibromide and 18.8 parts of ethylene dichloride is added, with agitation, 1.3 parts of 4,4'-thiobis(2,6-diisopropylphenol). The resulting composition is stable for long periods when exposed to air.

*Example XXIX*

With 1000 parts of melted lard is mixed 1 part (0.1 percent) of 4,4'-thiobis(2-methyl-6-tert-butylphenol). After cooling, the lard can be stored for long periods of time without the development of rancidity.

*Example XXX*

To 5000 parts of olive oil is added 1 part of 4,4'-thiobis(2-isopropyl-6-tert-butylphenol) and the mixture is agitated to produce a homogeneous blend which is stable to oxidative deterioration for a long period.

*Example XXXI*

To an additive-free solvent-refined crankcase lubricating oil having a viscosity index of 95 and a SAE viscosity of 10 is added 0.001 percent of 4,4'-thiobis(2-methyl-6-tert-butylphenol).

*Example XXXII*

To 1000 parts of a solvent refined neutral oil (95 VI and 200 SUS at 100° F.) containing 6 percent of a commercial methacrylate-type VI approver which gives the finished formulation a VI of 140 and a viscosity of 300 SUS at 100° F. is added 5 percent of 4,4'-thiobis(2,6-di-tert-butylphenol).

*Example XXXIII*

To 100,000 parts of dioctyl sebacate having a viscosity of 210° F. of 36.7 SUS, a viscosity index of 159 and a molecular weight of 426.7 is added 250 parts (0.25 percent) of 4,4'-thiobis (2-methyl-6-tert-butylphenol).

*Example XXXIV*

4,4'-thiobis(2 - methyl - 6 - tert-butylphenol) was dissolved in pure white refined mineral oil to the extent that $2.0 \times 10^{-2}$ moles per liter (0.84 weight percent) of the phenol was present in the mineral oil. Ferric hexoate was also added to the mineral oil. The concentration of the iron salt was adjusted to 0.05 percent based on $Fe_2O_3$. One milliliter of the resulting composition was charged to an apparatus for measuring the oxidative stability of the mineral oil. The apparatus consists of a glass vessel having a 12 milliliter capacity and an inlet tube which can be connected to a mercury manometer. The vessel is flushed with oxygen at atmospheric pressure and then connected to the mercury manometer. It is then immersed in a constant temperature bath at 150° C. whereupon the oxygen pressure rise is indicated on the manometer. The manometer is observed until a rapid pressure drop in the vessel occurs. The time from immersion to initiation of the pressure drop is referred to as the induction period of the mineral oil. When mineral oil containing the iron hexoate is subjected to this oxidative test, a pressure drop in the manometer is observed in from 2 to 3 minutes, showing that the mineral oil is unstable to oxidative deterioration at 150° C. However, when the composition containing $2.0 \times 10^{-2}$ per liter of 4,4'-thiobis(2-methyl-6-tert-butylphenol) is tested in this fashion, no pressure drop is observed in the manometer until after 300 minutes. Thus, the mineral oil has been improved by a factor of at least 100 against oxidative deterioration by the presence of this small amount of 4,4'-thiobis(2-methyl-6-tert-butylphenol).

This application is a continuation-in-part of our prior co-pending application Serial No. 720,825, filed March 12, 1958, now U.S. Patent No. 2,962,434.

I claim:

1. A composition of matter comprising a saturated hydrocarbon synthetic polymer derived from polymerization of an aliphatic monoolefin hydrocarbon compound having up to 4 carbon atoms and a small antioxidant quantity, up to about 5 percent, of 4,4'-thiobis(2-methyl-6-tert-butyl-phenol).

2. As a new composition of matter, polyethylene containing from 0.01 to about 2 percent of 4,4'-thiobis(2-methyl-6-tert-butylphenol).

References Cited in the file of this patent

UNITED STATES PATENTS

| | | |
|---|---|---|
| 2,675,366 | Pullman | Apr. 13, 1954 |
| 2,731,442 | Forman | Jan. 17, 1956 |
| 2,731,443 | Forman | Jan. 17, 1956 |
| 2,810,765 | Nueworth et al. | Oct. 22, 1957 |
| 2,814,597 | Wenneis et al. | Nov. 26, 1957 |

FOREIGN PATENTS

| | | |
|---|---|---|
| 201,160 | Australia | Apr. 28, 1955 |
| 772,938 | Great Britain | Apr. 17, 1957 |
| 796,285 | Great Britain | June 11, 1958 |

UNITED STATES PATENT OFFICE
CERTIFICATE OF CORRECTION

Patent No. 3,069,384　　　　　　　　　　　　December 18, 1962

Thomas H. Coffield

It is hereby certified that error appears in the above numbered patent requiring correction and that the said Letters Patent should read as corrected below.

Column 7, line 60, for "10 parts" read -- 100 parts --; column 8, line 41, for "35,00" read -- 35,000 --.

Signed and sealed this 3rd day of September 1963.

(SEAL)
Attest:

ERNEST W. SWIDER
Attesting Officer

DAVID L. LADD
Commissioner of Patents